Patented Mar. 20, 1945

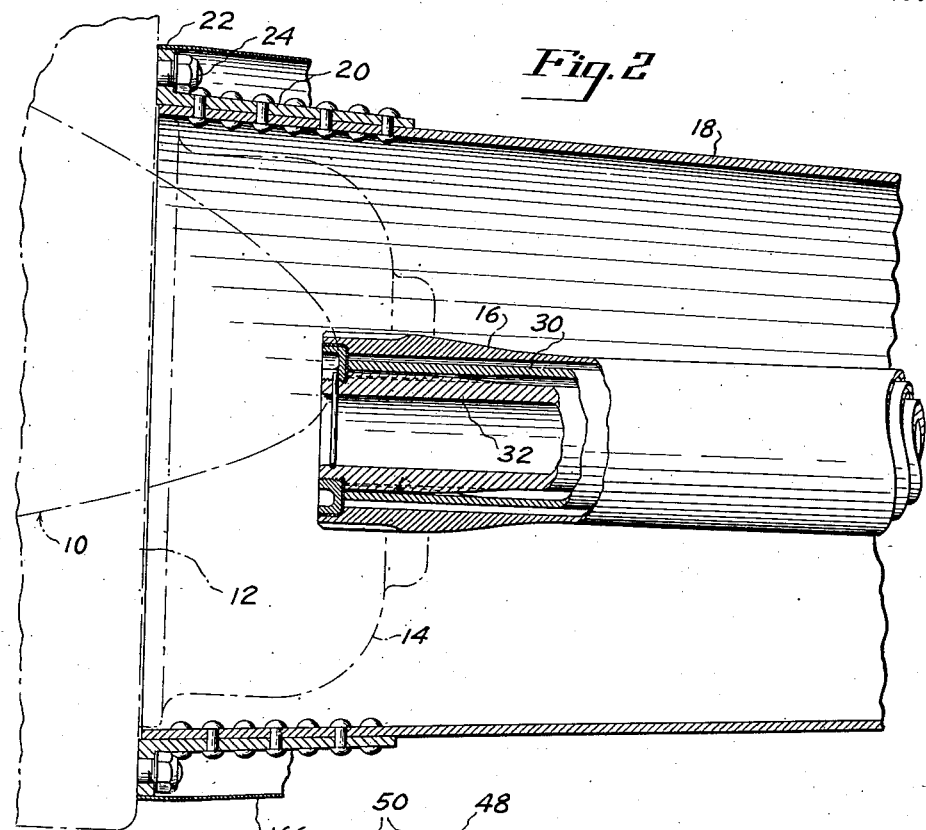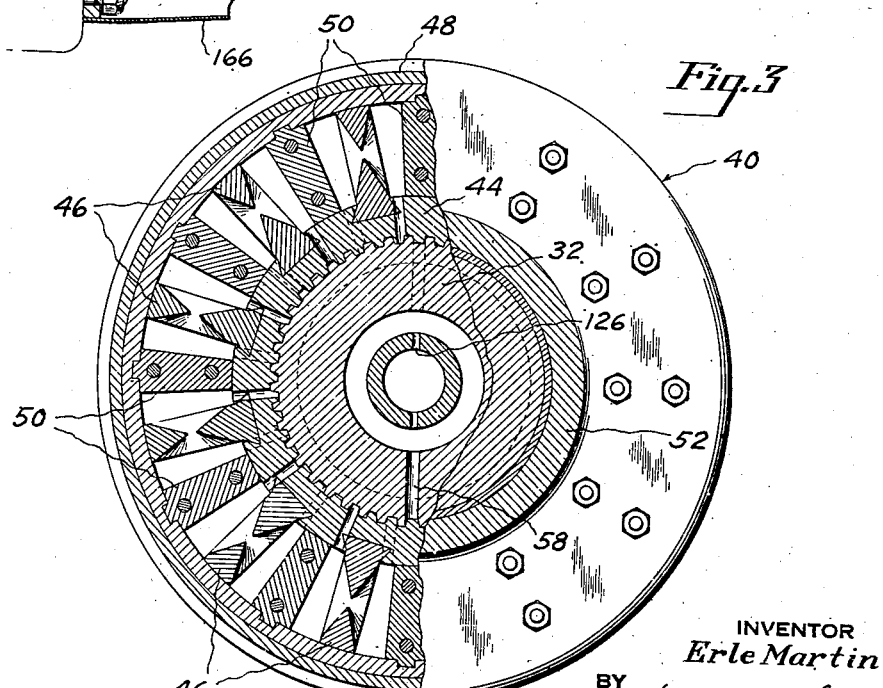

2,371,873

UNITED STATES PATENT OFFICE 2,371,873

PROPELLER WITH EXTENDED DRIVE

Erle Martin, West Hartford, Conn., assignor to United Aircraft Corporation, East Hartford, Conn., a corporation of Delaware Application May 8, 1940, Serial No. 333,981

14 Claims. (Cl. 170—135.6)

This invention relates to improvements in means for supporting and driving propellers and has particular reference to an improved supporting and driving means for a wing mounted airplane propeller.

An object of the invention resides in the provision of improved means for supporting the propeller from some part of an airplane such as a wing and for operatively connecting the propeller with an engine supported independently of the propeller support.

A further object resides in the provision of a flexible driving connection between an engine and a propeller and a support for said propeller and said driving connection.

A still further object resides in the provision of a support for an aircraft propeller arranged to carry the propeller at a spaced distance from a part of the airplane, such as a wing, said support also providing a support and container for the operating and control accessories of a controllable-pitch constant-speed propeller.

Other objects and advantages will be more particularly pointed out hereinafter or will become apparent as the description proceeds.

In the accompanying drawings, in which like reference numerals are used to designate similar parts throughout, there is illustrated a suitable mechanical embodiment for the purpose of disclosing the invention. The drawings, however, are for the purpose of illustration only and are not to be taken as limiting the invention since it will be apparent to those skilled in the art that various changes in the illustrated construction may be resorted to without in any way exceeding the scope of the invention.

In the drawings,

Fig. 2 is a sectional view of the rearward portion of the propeller support.

Fig. 3 is a sectional view on an enlarged scale on the line 3—3 of Fig. 1 of a flexible driving coupling incorporated in the drive between the engine and the propeller.

Figure 1:
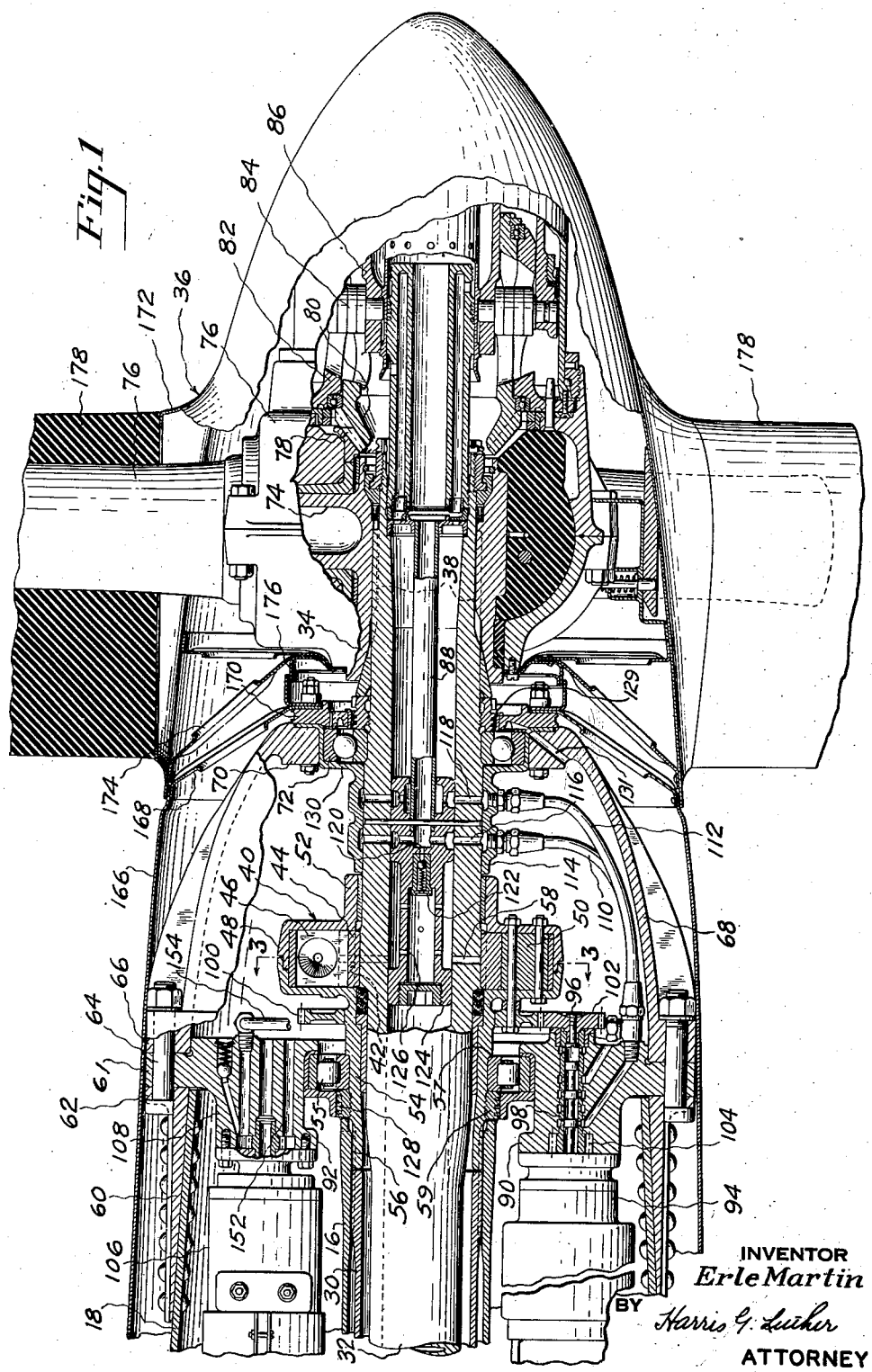
Fig. 1 is a sectional view of the forward portion of the propeller support and the hub portion of the propeller carried thereby.

Referring to the drawings in detail, and particularly to Fig. 2, the numeral 10 generally indicates the outline of an airplane part upon which the improved propeller support is mounted, the outline illustrated being that of the forward or nose portion of an airplane wing. The wing 10 may carry a nacelle provided with a rigid structural wall 12 which may be suitably apertured for the projection of the nose piece 14 of the independently supported engine therethrough. A drive shaft 16 projects forwardly of the engine and is surrounded by a substantially concentric tapered metal tubular member 18 provided at its wing attached end with a reinforcing ring 20 riveted or otherwise suitably secured thereto. The ring 20 is provided with an apertured radial flange 22 through which extend a plurality of bolts 24 for securing the end of the member 18 to the wall structure 12. If desired, the wall thickness of the member 18 may gradually diminish from the supporting wall 12 towards the propeller in order to diminish the structural weight of the support. At its end opposite the engine, the hollow drive shaft 16 has a spline connection with the forward end of a concentric inner shaft 30 which extends rearwardly and terminates near the engine connected end of the drive shaft 16. At its rearward end the hollow shaft 30 has a spline connection with a hollow inner shaft 32 which extends forwardly through the shaft 30 concentric therewith and into the hub 34 of the propeller, generally indicated at 36, a driving connection between the end portion of the shaft 32 and the propeller hub being provided by the spline 38. From this description it will be observed that a driving connection has been provided between the engine 14 and the propeller 36 and that the drive will have great flexibility because of the excessive effective length of the three-part drive shaft and the ability of the parts of the drive shaft to deflect torsionally. This flexibility is damped by means of a fluid friction coupling generally indicated at 40 and illustrated in section in Fig. 3.

The inner shaft 32 is provided at a point beyond the partition 61 with a splined radial enlargement 42 upon which is mounted an internally splined ring 44 provided with peripheral T slots into which are fitted a plurality of angularly spaced apertured vanes 46. A two part casing 48 surrounds the vanes 46 and carries imperforate vanes 50 disposed one between each pair of adjacent apertured vanes 46. At its forward end the casing is provided with a cylindrical flange 52 which has a bearing on the surface of the shaft 32 and at its rearward side this casing is provided with a cylindrical extension 54 which extends through the inner race of the bearing 55 and has a spline connection 56 with the forward end of the outer drive shaft 16. The inner race of the bearing 55 is clamped on the sleeve 54 between an integral annular shoulder 57 and a nut 59 screw threaded onto the sleeve, and the outer race is carried in an aperture in a transverse partition 61 secured to the end of the member 18. The outer shaft member 16 has a spline connection at its end toward the propeller with the adjacent end of the member 30 and with the sleeve 54 and also has a locking connection with the nut 59 to retain the nut in adjusted position on the sleeve 54.

Hydraulic fluid, such as lubricating oil, is supplied to the spaces between the vanes 46 and 50 within the casing 48 from the interior of the hollow shaft 32 through a plurality of radial ports 58. When the vanes 46 tend to move relative to the vanes 50 the hydraulic fluid within the coupling will be forced through the restricted apertures in the vanes 46 from one side thereof to the other and will cause, by fluid friction, a damping of the relative movements between the vanes 46 and 50 which movements correspond to the relative movements between the forward end of the outer drive shaft 16 and the portion of the inner drive shaft 32 at the location of the coupling.

This arrangement provides an extremely soft, cushioned, drive for the propeller which will suppress the transmission of torsional vibrations of the engine to the propeller.

The tubular member 18 terminates at the rearward face of the partition 61 and is provided around this forward end portion with a reinforcing band 60, riveted or otherwise suitably secured thereto, which band is provided with an apertured radial flange 62 which fits against the rearward face of the partition 61. A plurality of angularly spaced bolts, as indicated at 64, extend through the apertures in the flange 62, through registering apertures in the outer portion of the partition 61 and through apertures in a flange 66 provided on the rearward end of a bearing supporting nose piece 68, the flange 62, partition 61 and flange 66 being clamped together by the bolt 64 in fluid tight association with each other. At its forward portion the nose piece 68 is provided with a reinforced apertured end wall 70 which receives the main outboard propeller bearing 72 which rotatably supports the outer portion of the propeller shaft 32 in the end of the nose piece.

The propeller 36 may be of the general character particularly illustrated and described in United States Patent Number 2,174,717 for Multiposition controllable pitch propeller, issued October 3, 1939, to Frank W. Caldwell, Erle Martin and John E. Anderson or in United States Patent No. 2,280,713, for Feathering propellers, issued April 21, 1942, by Erle Martin, John E. Anderson and Murray C. Beebe, Jr., and comprises, in general, a hub member 34 rigidly secured on the end of the drive shaft 32 and provided with radially extending integral arms 74 about which the hollow metal blades 76 are rotatably mounted, the blades being retained in operative position on the respective arms by suitable anti-friction thrust bearings each disposed between a flange on the respective blade end and an inwardly directed flange formed on a hub barrel member 76 which encloses the hub 34 and the root ends of the blades. A gear member, as indicated at 78, is secured on the root end of each propeller blade and these blade carried gears mesh with the pitch changing gear 80 which is rotatably mounted in a cam member 82 rigidly secured to the forward end of the hub member 34. The gear 80 is provided with a cam sleeve which is concentric with the cam member 82 and a plurality of cam followers, as indicated at 84, cooperate with the cam member 82 and the cam sleeve on the gear 80 to rotate the gear 80 whenever the cam followers are moved through cam slots provided in these above mentioned cam elements. The cam followers are operated by a piston member 86 which is reciprocated by fluid pressure in a cylinder connected to the forward space of the hub member 74. Hydraulic fluid for operating the piston is led through the interior of the drive shaft 32, two passages for the double acting piston being provided by arranging a tube 88 in the drive shaft in such a manner that one passage is provided through the interior of the tube and another passage is provided through the space between the tube and the inner wall of the drive shaft.

As the construction and operation of the type of propeller illustrated is illustrated and described in detail in the patent and applications referred to above it is thought that a further description of the propeller pitch changing mechanism is not necessary for the purposes of this disclosure.

Since propellers of the hydraulically actuated feathering type require hydraulic fluid at different pressures for complete operation means have been provided in the illustrated arrangement for supplying hydraulic fluid at one pressure under the control of a speed responsive governor for the constant speed operation of the propeller and means have also been provided to supply hydraulic fluid to the propeller at a higher pressure to feather the propeller and to supply fluid at a still higher pressure to return the propeller from its feathered condition to its operative or constant speed control range of pitch angles.

While a particular propeller construction has been illustrated in the accompanying drawings and herein briefly described, for the purpose of disclosing the invention, it is to be understood that the invention is not limited to any particular propeller construction but that other types of propellers may be used such as electrically actuated controllable pitch propellers or fixed or adjustable pitch propellers.

The partition 61 is provided with extensions 90 and 92 which are preferably formed integrally therewith. A speed governor 94 is mounted on the rearward face of the extension 90 and controls a valve 96 operative in a bore provided in the extension 90. The governor is driven by the shaft 98 which is geared to the shaft 32 by means of the gears 100 and 102 and may include a pump 104.

A motor driven high pressure pump 106 is mounted on the partition extension 108 and the pumps 104 and 106 are connected with the pitch changing mechanism of the propeller by means of a pair of conduits 110 and 112 and the oil transfer bearing 114. From the bearing 114 radial ports 116 and 118 extend through the wall of the shaft, the ports 116 leading to the interior of the tube 88 and the ports 118 leading to the space between the tube 88 and the shaft. An aperture 120 extends from the end of the tube 88 opposite the propeller through a check valve 122 into a closed cavity provided in the rearward portion of the plug 124 which serves to receive the end of the tube 88 and divide the connection of the ports 116 and 118. From the cavity in the rearward portion of the plug apertures 126 in the plug, connect with the ports or apertures 58 leading to the interior of the fluid coupling 40 to provide a continuous supply of hydraulic fluid to the interior of the coupling.

The interior of the nose piece 68 serves as a reservoir for the hydraulic fluid for operating the propeller and filling the coupling 40 and, in order to retain the fluid in the interior of the nose piece, the nut 59 is provided, around its exterior, with a fluid seal 128, and the transfer bearing 114 is extended forwardly and suitably flanged as indicated at 130 to seal the shaft 32. The bearing 72 is provided with a seal 129 and oil return 131 and both bearings 55 and 72 may be lubricated by the fluid from the reservoir in the nose piece 68. If pressure lubrication is desired the bearings may be connected with the outlet or relief vent of the pump 104.

Figure 4:
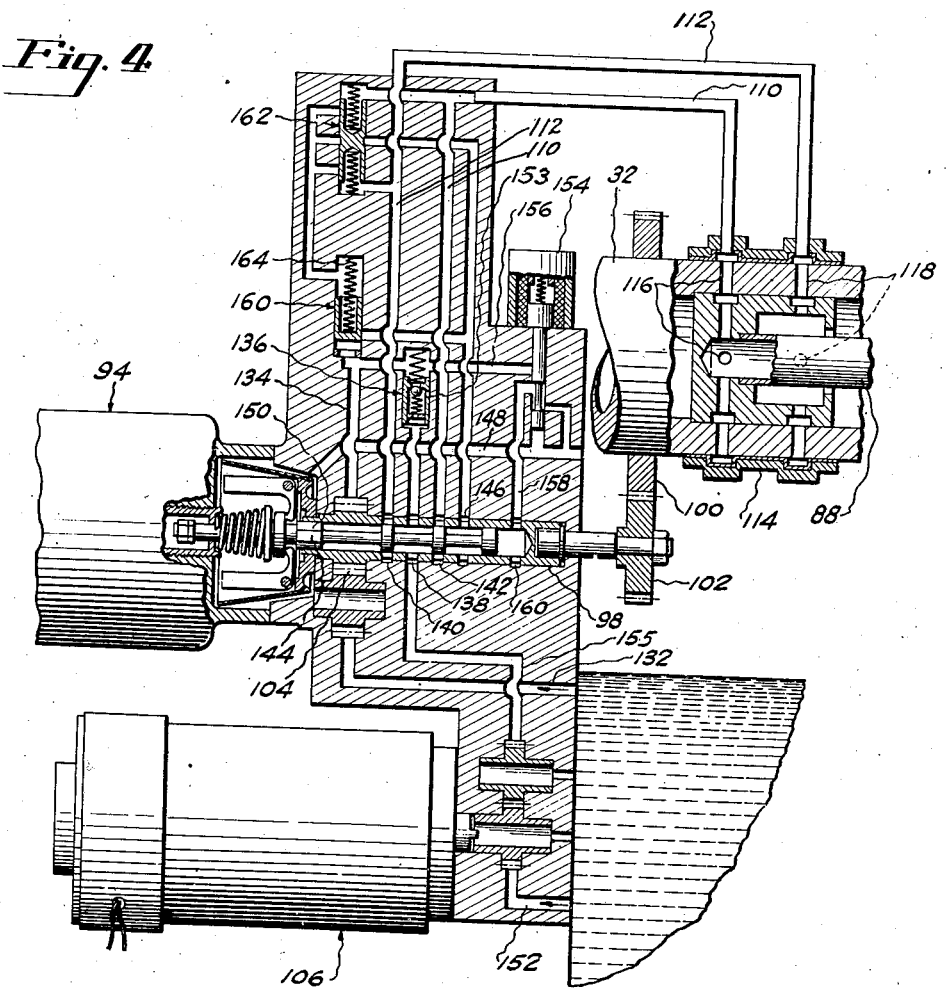
Fig. 4 is a diagrammatic view to illustrate the operation of the propeller pitch controlling instrumentalities.

The construction and operation of the pitch controlling mechanism is schematically illustrated in Fig. 4. As shown in this figure the booster pump 104 has an intake 132 from the fluid reservoir and an outlet 134 which is connected through a check valve 136 with an annular port 138 in the hollow drive shaft 98. A port 140 in the shaft 98 is connected through the channel 112 with the interior of the shaft 32 surrounding the tube 88 and a port 142 on the opposite side of the port 138 from the port 140 is connected with the interior of the tube 88 through the channel 110. The slidable valve stem 144 is provided with annular pistons so arranged that movements of the stem towards the governor will connect the ports 138 and 140 and will connect the port 142 with the annular port 146 leading to the drain channel 148 and movement of the stem 144 away from the governor will connect the ports 138 and 142 and connect the port 140 with the drain channel 148 through passageway 150 provided in the governor connected end of the valve stem. Since the interior of the tube 88 and the space between this tube and the shaft 32 lead to opposite sides of the pitch changing piston 86, it will be observed that the above described apparatus will alternatively supply fluid under pressure to one side of the piston and connect the opposite side with the drain channel as the valve stem 144 is moved by the governor 94 in response to speed variations of the shaft 32. This control of the pitch changing mechanism by the governor will cause the shaft 32 to rotate at a substantially constant speed.

The motor driven high pressure pump 106 is connected with the interior of the reservoir by an inlet channel 152 and this pump has an outlet channel 154 which leads to the port 138 in the governor drive shaft 98. When it is desired to feather the propeller a switch will be closed to energize the motor of the pump 106 and this switch will simultaneously energize the solenoid of the solenoid valve 154. When the high pressure pump 106 begins to operate the high pressure fluid will actuate the check valve 136 to close off the outlet 134 of the pump 104 and connect the outlet 155 of the pump 152 with the channel 112 and through a port 153 in the check valve 136, with a branch channel 156 leading to the valve 154 which channel is connected by the operation of the solenoid valve 154 with a channel 158 leading to an annular port 160 in the end portion of the shaft 98 remote from the governor. The end portion of the shaft 98 is closed and the high pressure fluid entering the space in the end of the hollow shaft will act against the adjacent end of the valve stem 144 and hold the valve stem in its limiting position of movement towards the governor thereby throwing the governor 94 out of operation so that the flow of oil from the pump 152 through the channel 112 to the pitch changing mechanism will not be interrupted by operation of the governor as the propeller slows down. This same movement of the valve plunger 144 will connect the channel 110 with the drain line 148 through the ports 146 so that the pitch changing mechanism may move freely in a direction to increase the pitch of the propeller to the feathered condition.

The outlet pressure of the governor pump 104 is controlled by a relief valve 160 to which the pump pressure is applied through a slide valve 162 operatively connected with the channels 110 and 112 so that the relief valve tends to maintain an outlet pressure greater than the pressure in the channels 110 or 112 by the amount of the resistance of the relief valve spring 164.

For a more detailed description of the constant speed and feathering control shown in Fig. 4 reference may be had to United States Patent No. 2,361,954 for Propeller control means, issued November 7, 1944, to Erle Martin.

Certain features of the governor and control mechanism shown but not claimed in this application are claimed in co-pending U. S. application Serial No. 464,621.

If desired the forward portion of the propeller support may be covered by a streamlined sheet metal casing 166 the forward end of which may be supported by means of an internal sheet metal ring structure 168 secured externally to the end of the casing and internally to the bearing retaining plate 170 for the bearing 72. The propeller hub may also be covered by a rotatable sheet metal spinner 172 the rearward end of which may be supported by a sheet metal ring member 174 connected at its outer edge to the rearward edge of the spinner and at its inner edge to the structure of the de-icing fluid distributing ring 176. In order to somewhat increase the efficiency of the propeller it may also be desirable to cover the shank portions of the blades 76 with cuff members 178 which may be formed of expanded rubber or some other suitable light weight material.

While a suitable mechanical embodiment has been illustrated in the accompanying drawings and hereinabove described for the purpose of disclosing the invention, it is to be understood that the invention is not limited to the particular construction so illustrated and described, but that such changes in the size, shape and arrangements of the various parts may be resorted to as come within the scope of the sub-joined claims.

Having now described the invention so that others skilled in the art may clearly understand the same, what it is desired to secure by Letters Patent is as follows.

I claim:

1. In a propeller driven vehicle supporting an engine and a propeller independently of each other, a structural member fixed on said vehicle, a hollow member fixed at one end to said structural member and extending outwardly therefrom, an outboard bearing and a support therefor at the end of said hollow member opposite said structural member, a transverse partition in said hollow member, a drive shaft extending from said engine through said hollow member, through said partition, and through said outboard bearing, a hydraulically actuated controllable-pitch propeller mounted on the projecting end of said drive shaft beyond said bearing, propeller pitch controlling means mounted on said partition and completely enclosed within said hollow member beside said drive shaft, and a reservoir for hydraulic fluid for operating said propeller having walls formed by said partition and said bearing support provided adjacent to said propeller means within said reservoir for conducting fluid to the interior of said drive shaft including a transfer bearing arranged so that leakage will drain into said reservoir.

2. In a propeller driven vehicle having an engine supported independently of the propeller support, a propeller support comprising a member fixed at one end to fixed structure of said vehicle, a transverse partition at the opposite end of said member from said fixed end, a bearing support secured to said member and extending outwardly from said partition, a bearing carried by said support, a drive shaft extending from said engine along said member and through said partition, said bearing support, and said bearing, an hydraulically-actuated controllable-pitch propeller mounted on the projecting end of said drive shaft beyond said bearing, propeller pitch controlling means mounted on said transverse partition within said member, said bearing support comprising a closed chamber for storing hydraulic fluid, said pitch controlling means utilizing said fluid to change the propeller pitch, and said bearing being supported within said bearing support and receiving its lubrication from said fluid.

3. A flexible propeller drive comprising, three concentric tubular shaft sections in which the outer section is adapted to be connected at one end to a propeller driving engine and is connected at its opposite end to the corresponding end of the intermediate shaft section, the intermediate shaft section is connected to the corresponding end of the inner section at its end adjacent to said one end of said outer section and said inner section is provided with a propeller receiving portion projecting beyond said opposite end of said outer section, and a two part fluid friction damper having one part rigidly secured to said opposite end of said outer section and the other part rigidly secured to said inner section to frictionally damp torsional movements between said outer and said inner shaft sections.

4. The arrangement as set forth in claim 3 in which all the connections between said shaft sections are torsionally positive but completely free in a direction along the axis of said sections.

5. The arrangement as set forth in claim 3 in which said tubular inner shaft section receives hydraulic fluid under pressure and includes channels for conducting hydraulic fluid to the interior of said fluid friction damper.

6. In a propeller driven vehicle having an engine supported independently of the propeller support, a propeller support comprising a member fixed at one end to fixed structure of said vehicle and extending outwardly therefrom, a bearing support secured to said member and extending outwardly therefrom, a drive shaft extending from said engine along said member and through said bearing support and said bearing, a hydraulically actuated controllable pitch propeller mounted on the projecting end of said drive shaft beyond said bearing, a closed chamber adjacent said bearing for storing hydraulic fluid, propeller pitch controlling means utilizing said fluid to change the propeller pitch, said drive shaft comprising a plurality of concentric overlapping shafts having their ends operatively connected to provide a continuous drive from said engine to said propeller through all of said shafts in sequence, a torsional damping device located in said reservoir and connecting the inner and outer of said shafts, means for conducting a portion of said hydraulic fluid to said damping device, said damping device being arranged so that leakage therefrom drains directly into said reservoir.

7. In a propeller driven vehicle supporting an engine and a propeller independently of each other, a propeller support comprising a member fixed at one end to fixed structure of said vehicle and extending outwardly therefrom, an outboard bearing, a support therefor at the outboard end of said member, a drive shaft extending from said engine along said member and through said outboard bearing and said bearing support, an hydraulically actuated controllable-pitch propeller mounted on the projecting end of said drive shaft beyond said bearing, propeller pitch controlling means mounted within said member, a separate hydraulic fluid supply, independent of engine lubricating oil, for hydraulic fluid utilized by said pitch controlling means for operating said propeller, including a reservoir provided in said member adjacent said bearing, means, including a transfer bearing, within said reservoir for conducting the portion of said fluid utilized by said pitch controlling means to the interior of said drive shaft, said transfer bearing arranged so that leakage therefrom will drain directly into said reservoir.

8. A device as described in claim 6 in which means including a transfer bearing are provided in said reservoir for conducting fluid from said pitch controlling means to the interior of said driven shaft and in which the transfer bearing and said damping device are both arranged so that drainage therefrom drains directly into said reservoir.

9. A device as described in claim 7 in which the outboard bearing receives its lubrication from said fluid and is arranged so that fluid after lubricating said bearing drains directly into said reservoir.

10. A device as claimed in claim 2 including a drive shaft comprising, a plurality of concentric overlapping shafts, having one free end on the outside shaft and one free end on the inside shaft, and having their remaining ends operatively connected to provide a continuous drive connection from said engine to said propeller through all of said shafts in sequence and a torsional damping drive between the inner and outer of said shafts, located in said closed chamber, one of said free ends comprising a propeller carrying end portion extending through said torsional damping device.

11. A device as described in claim 6 in which the outboard bearing receives its lubrication from said fluid and a transfer bearing is located in said reservoir for transferring fluid from said pitch controlling means to the interior of said drive shaft.

12. In a propeller driven vehicle having an engine supported independently of the propeller support, a propeller support comprising a member fixed at one end to fixed structure of said vehicle, a transverse partition at the opposite end of said member from said fixed end, a bearing supported in said partition, a bearing support secured to said member and extending outwardly from said partition, a second bearing carried by said support, a drive shaft extending from said engine along said member and through said partition, said bearing support, and both said bearings, an hydraulically-actuated controllable-pitch propeller mounted on the projecting end of said drive shaft beyond said bearings, propeller pitch controlling means mounted on said transverse partition within said member, said bearing support, said shaft, and said partition constituting a closed chamber for storing hydraulic fluid, said pitch controlling means utilizing said fluid to change the propeller pitch, and said bearings being supported within said propeller support and receiving their lubrication from said fluid.

13. In a propeller driven vehicle supporting an engine and a propeller, a propeller support comprising a member extending outwardly from said vehicle and said engine, an outboard bearing, a support therefore at the outboard end of said member, a drive shaft extending from said engine along said member and through said outboard bearing and said bearing support, an hydraulically-actuated controllable-pitch propeller mounted on the projecting end of said drive shaft beyond said bearing, a generally elongated propeller pitch controlling means wholly mounted within said member with its longitudinal axis generally parallel to said drive shaft, a separate hydraulic fluid supply, independent of engine lubricating oil, for hydraulic fluid utilized by said pitch controlling means for operating said propeller, including a reservoir provided in said member adjacent said bearing and surrounding said shaft, a transfer bearing within said reservoir for conducting the portion of said fluid utilized by said pitch controlling means to the interior of said drive shaft, at least one end of said transfer bearing being within said reservoir so that leakage therefrom will drain directly into said reservoir.

14. In a propeller driven vehicle supporting an engine and a propeller, a propeller support comprising a member extending outwardly from said vehicle and said engine, an outboard bearing, a support therefor at the outboard end of said member, a drive shaft extending from said engine along said member and through said outboard bearing and said bearing support, an hydraulically-actuated controllable-pitch propeller mounted on the projecting end of said drive shaft beyond said bearing, propeller pitch controlling means mounted within said member, a separate hydraulic fluid supply, independent of engine lubricating oil, for hydraulic fluid utilized by said pitch controlling means for operating said propeller, including a reservoir provided in said member adjacent said bearing and surrounding said shaft, a transfer bearing within said reservoir for conducting the portion of said fluid utilized by said pitch controlling means to the interior of said drive shaft, at least one end of said transfer bearing being within said reservoir so that leakage therefrom will drain directly into said reservoir, said outboard bearing and said transfer bearing arranged so that the outboard bearing receives its lubrication from fluid leakage from one end of said transfer bearing, and a drain connecting the outboard side of said outboard bearing with the reservoir so that fluid, after lubricating said bearing, drains directly into said reservoir.

ERLE MARTIN.